Patented Oct. 15, 1946

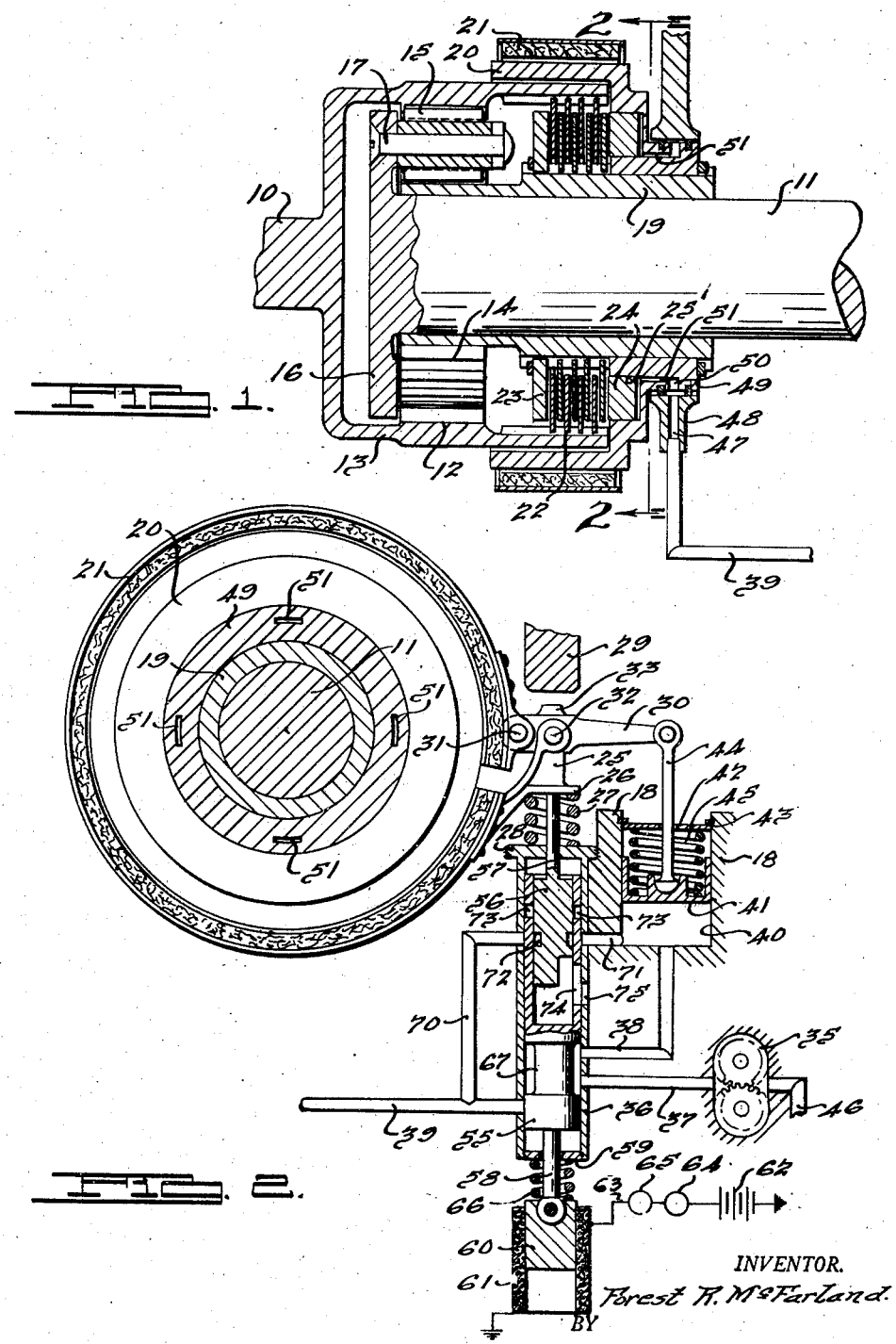

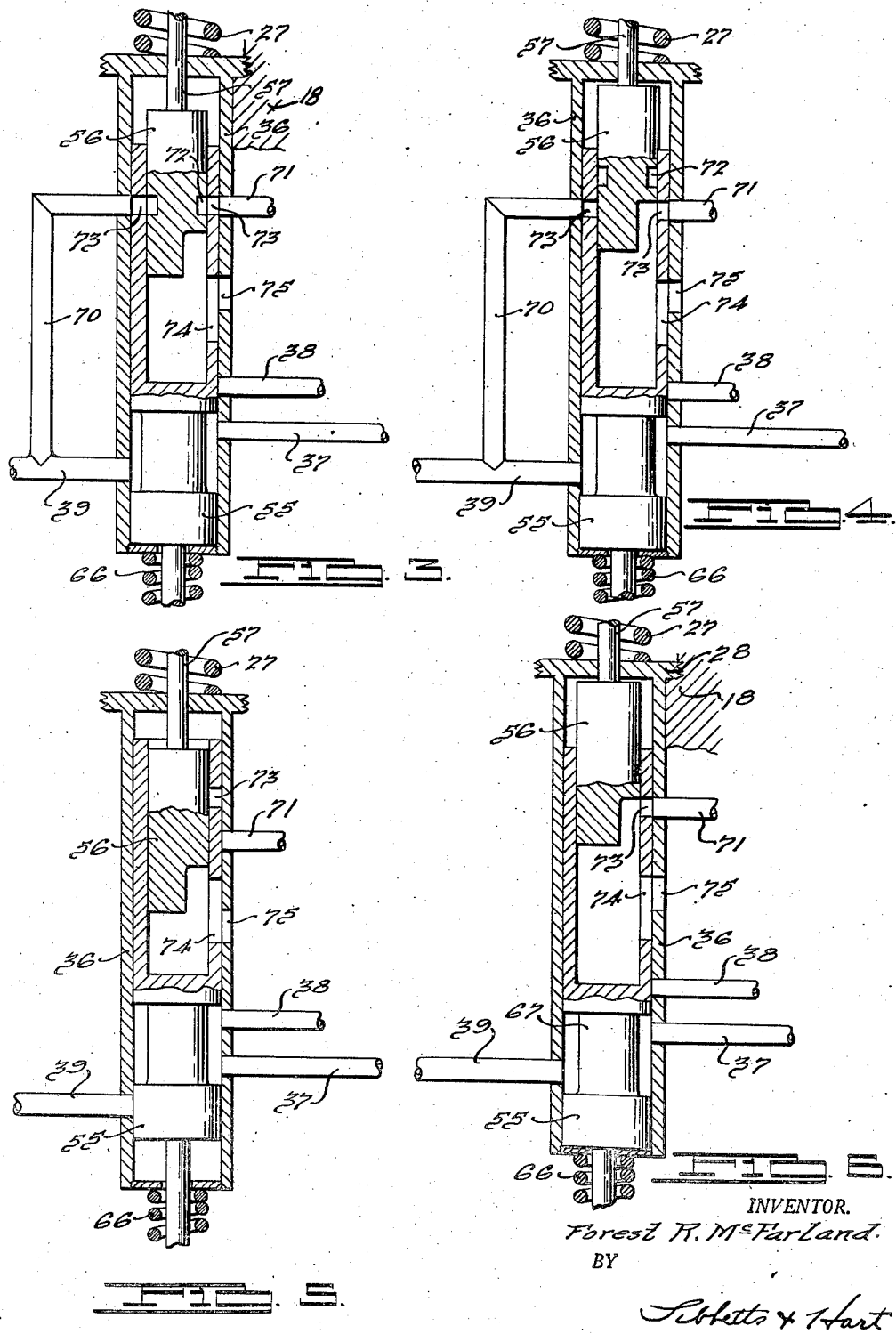

2,409,506

UNITED STATES PATENT OFFICE 2,409,506

DRIVE MECHANISM

Forest R. McFarland, Huntington Woods, Mich., assignor to Packard Motor Car Company, Detroit, Mich., a corporation of Michigan Application September 23, 1943, Serial No. 503,455

13 Claims. (Cl. 74—290)

This invention relates to change speed drive mechanism and more particularly to control means for such mechanism.

Drive mechanism very often has planetary gearing arranged to provide a two speed driving connection between a driving shaft and a driven shaft. Drive through the gearing is usually controlled by means for locking the sun gear and the ring gear together to provide direct drive and by means for holding the sun gear stationary to provide a modified driving speed. A brake band having a stationary anchored end is sometimes utilized to hold the sun gear and a disk clutch is sometimes utilized to lock the sun gear and the ring gear together. The control is usually such that either the brake or the clutch can be applied but when one is applied the other is released.

With the drive control for planetary gearing referred to, two extreme conditions exist when releasing the brake. If the brake is fully released before the clutch is fully effective, the clutch will slip during such interval. If the released brake is still partially engaged when the clutch is fully effective, the dual drives will fight and cause grabbing of the clutch. Either one of these two conditions is undesirable.

An object of this invention is to provide control means for planetary drive gearing of the character referred to that will be free from the undesirable conditions previously outlined through the provision of synchronizing mechanism.

Another object of the invention is to provide a planetary gearing control means, of the character previously referred to, in which brake release is delayed until the clutch has taken sufficient torque off from the brake band to prevent grabbing or spinning of the clutch.

Another object of the invention is to synchronize the release of a band, for holding the sun gear of planetary drive gearing, with the engagement of a disk clutch for locking the sun gear and ring gear of the planetary gearing so that clutch grabbing and spinning will be eliminated.

Other objects of the invention will appear from the following description taken in connection with the drawings, which form a part of this specification, and in which:

Fig. 1 is a sectional view of drive mechanism in which two shafts are connected by planetary gearing;

Fig. 2 is a sectional view of the drive mechanism taken on line 2—2 of Fig. 1 with the control means shown schematically;

Fig. 3 is an enlarged sectional view of the control means taken in a different position from that shown in Fig. 2;

Fig. 4 is another enlarged sectional view of the control means in brake released and clutch engaged position;

Fig. 5 is a sectional view of a modified control valve structure shown in position for effecting brake engagement and clutch release;

Fig. 6 is a view of the modified form of valve structure similar to Fig. 5 with the parts adjusted for clutch engagement and brake release.

Referring to the drawings by characters of reference, the drive mechanism comprises drive member 10, driven member 11 and planetary gearing connected in drive transmitting relation with such members. The planetary gearing has a ring gear 12 formed on the interior of a hollow head 13 at the end of member 10, a sun gear 14, planet gears 15 meshing with the sun and ring gears and a carrier 16 formed on member 11 and from which pins 17 extend and serve as journals for the planet gears. Members 10 and 11 are in the form of shafts and member 10 is connected with a suitable source of power, such as an engine. This drive device is suitable for many purposes and can serve as a part of the drive for a motor vehicle. The drive mechanism is carried in a suitable casing as indicated diagrammatically by numeral 18.

Control mechanism is associated with the planetary gearing to provide two driving speeds therethrough. The sun gear is part of a sleeve 19 rotatably mounted on shaft 11 and brake drum 20 is keyed on the end of this sleeve remote from the sun gear. Band 21 extends around the drum and when applied holds the drum, sleeve and sun gear stationary to provide a means for establishing a modified drive through the planetary bearing. The other driving speed through the planetary gearing is provided by means for locking two members of the gearing together and such members can be the ring and sun gears. Such locking means can be in the form of a clutch having alternate disks 22 splined on the sun gear sleeve and the shaft head 13 but axially movable with respect thereto. The clutch has a backing plate 23 and a pressure plate 24, the latter plate being slidably mounted in a recess 25' in the brake drum. When the clutch is engaged the planetary gearing will be locked up so that the drive will be direct positive therethrough from shaft 10 to shaft 11.

One end of the brake band is fixed to an anchor bracket 25 that is movable to a limited extent in response to torque reaction on the sun gear and transmitted to the band through the brake drum fixed to the sun gear sleeve. This bracket has a seat portion 26 resting on coil spring 27 mounted on wall 28 in the casing 18. The casing also has an abutment wall 29 therein above the anchor bracket so that these walls limit the movement of the brake band anchor bracket in response to torque reaction on the brake drum. The brake band has an actuator lever 30 pivoted thereto at 31 and pivotally supported on the anchor bracket by pin 32. Boss 33 on this lever is arranged to engage the abutment wall 29.

The brake means and the clutch means are arranged to be engaged by means such as a hydraulic system and which is controlled by valve mechanism selecting the means to be engaged. The hydraulic system as shown in Figs. 1 to 4 inclusive includes a pressure means such as pump 35, a valve housing 36 connected with the pump by conduit 37, and outlet conduits 38 and 39 leading from the valve housing. Conduit 38 communicates with a cylinder 40 in which piston 41 is mounted. The cylinder can be formed as a part of casing 18 and is closed at one end by a cover plate 42 held in place by snap ring 43. Link 44 extending through the cover plate connects the piston with the lever 30 and spring 45 between the cover plate and the piston acts to normally move the piston downwardly to expand the brake band so that the brake drum and sun gear are released. The pump is connected with a suitable source of fluid (not shown) by means of conduit 46.

Conduit 39 is connected with a passage 47 in a bearing wall 48 in casing 18 in which one end of the brake drum hub 49 is mounted. This hub has an annular groove 50 open to passage 47 and passages 51 extend in an axial direction through the drum hub to connect groove 50 with the recess 25'. Fluid pressure in the recess will force pressure plate 24 in a direction engaging the clutch plates 22 to establish direct drive through the planetary gearing.

In the casing 36 is a compound valve mechanism comprising a cylindrical control member 55 with a hollow end in which a piston relief control valve 56 for the brake means is slidably mounted. The valve member 56 is connected with brake band anchor bracket 25 by stem 57 and moves therewith in response to torque reaction transmitted to the brake drum from the sun gear. The control valve member 55 has a stem 58 extending through an opening in the removable bottom wall 59 of the valve casing. This stem can be suitably actuated and is shown connected to the core 60 of a solenoid 61. The solenoid is connected with battery 62 by conductor 63 in which is arranged switches 64 and 65 in series. Switch 64 can be manually operated while switch 65 is preferably operated by a speed governor when the drive mechanism is used in a motor vehicle. Spring 66 acts to move the valve member 55 downwardly in the valve casing and the solenoid moves the valve member 55 upwardly when energized above some predetermined speed.

Conduits 37 and 38 open into the valve casing so that they can be exposed to a reduced diameter portion 67 of valve member 55 when in the upper position into which it is moved by the energized solenoid, as shown in Fig. 2. In such position, fluid under pressure can flow from the pump to chamber 40 and will move the link 44 and the end of lever 30 to which the link is pivoted upwardly to thus rock the other end of the lever downwardly to contract and apply the brake band to the drum. When the brake band is expanded, boss 33 will engage against abutment wall 29, but torque reaction on the drum when held by the band will move the anchor bracket 25 downwardly, as shown in Fig. 2.

When the solenoid is deenergized by opening the governor switch below the predetermined vehicle speed, spring 66 will move the valve member downwardly closing off the end of conduit 38 from conduit 37 and opening conduit 39 to conduit 37, such conduit 39 previously having been closed by the valve member in its upper position, as shown in Fig. 3. Fluid pressure can now flow through conduit 39 to engage the clutch and thereby lock up the planetary gearing and fluid from conduit 39 is also utilized to temporarily maintain pressure against the brake band engaging piston. Conduit 70 leads from the conduit 39 to the upper portion of the valve casing and conduit 71 connects chamber 40 with the valve casing. When torque reaction moves the valve member 56 downwardly a circular groove 72 will register with conduits 70 and 71 but flow is shut off by valve member 55 until it moves down so that ports 73 therein register with conduits 70 and 71 whereupon fluid under pressure can flow from conduit 39 to the piston chamber and thereby keep the brake band applied until reduction of torque reaction on the brake drum permits the anchor bracket 25 and valve member to be moved upwardly by spring 27. Such movement of valve member 56 will close communication between ports 73 and will open conduit 71 and the port 73 adjacent thereto to the interior of the hollow portion of valve member 55 which has a drain port 74 now registering with drain port 75 in the valve casing as shown in Fig. 4. This drainage of fluid will of course release pressure against piston 41 so that spring 45 will move the band actuating mechanism to releasing position.

In Figs. 5 and 6, a modified form of valve mechanism is disclosed for obtaining the same results as those previously described. In this form of the invention, conduit 70, recess 72 and one of ports 73 have been eliminated as in many installations the fluid trapped in conduits 38, 71 and chamber 40 will remain adequate to keep the piston in brake band engaging position against the pressure of spring 45. The positions of the valve members in Fig. 5 correspond to that of such members in Fig. 2 and in Fig. 6, the positions of the valve members correspond to those of the members in Fig. 4. In this instance, port 73 registers with conduit 71 when the valve element is moved to clutch engaging position but valve member 56 will shut off flow to the relief ports 74, 75 until torque reaction on the brake band is reduced to allow the member 56 to move upwardly, whereupon port 73 is uncovered and conduit 71 can drain into the hollow valve member and through ports 74 and 75.

The brake is thus delayed in releasing as dictated by torque reaction on the sun gear and this is controlled by the locking engagement of the disk clutch. So until the clutch takes sufficient torque off from the brake band it will not release. This control of the brake will synchronize its release automatically at the proper time during clutch engagement to prevent either clutch spinning or grabbing.

It will be understood that various forms of the invention other than that described above may

What is claimed is:

1. In a drive mechanism, a drive shaft, a driven shaft, planetary gearing including a plurality of members adapted to connect said shafts in drive relation, clutch means operable to lock two of said planetary gearing members together for unitary rotation, brake means applicable to hold one of said planetary gearing members from rotation and responsive to torque reaction on the member to maintain the application, means for selectively engaging the brake means or the clutch means, and means opposing the force of torque reaction to maintain application of the brake means whereby the brake means will be released in advance of the full application of the clutch means.

2. In a two speed drive mechanism, a drive shaft, a driven shaft, planetary gearing for establishing either one of two driving speeds from the drive shaft to the driven shaft, means for locking two portions of the planetary gearing to establish direct drive between the shafts, means for holding one member of the planetary gearing to establish a modified drive from the drive shaft to the driven shaft, hydraulic means for controlling said locking means and said holding means to apply either one and to release the other, and valve means for the hydraulic means controlled by torque reaction on the holding means for delaying the release of the holding means until the locking means is applied.

3. In a drive mechanism, a drive shaft, a driven shaft, planetary gearing including a plurality of members adapted to connect said shafts in drive relation, clutch means operable to lock two of said planetary gearing members together for unitary rotation, brake means applicable to hold one of said planetary gearing members from rotation and responsive to torque reaction on the member to maintain the application, means for selectively engaging the brake means or the clutch means, and a spring opposing the force of torque reaction to maintain application of the brake means whereby the brake means will be released in advance of the full application of the clutch means.

4. In a drive mechanism, a driving shaft, a driven shaft, planetary gearing for establishing a driving connection between the said shafts, a clutch for locking the planetary gearing to establish one driving relation, a self-energizing brake for holding one part of the planetary gearing to establish another driving relation, hydraulic means for selectively engaging the brake or the clutch, compound valve means controlling said hydraulic means, a solenoid controlling one portion of the compound valve means to select the application of the hydraulic means to the brake or to the clutch, and a connection between the brake and another portion of the valve means for delaying the release of the brake until the clutch is partially engaged.

5. In a drive mechanism having a drive member, a driven member and planetary gearing, including a sun gear and a ring gear, establishing the drive connection between said members, means for controlling the drive through the planetary gearing comprising brake means operable to hold said sun gear to establish one driving speed, clutch means operable to lock the sun gear and the ring gear together to establish another driving speed, control means operable to selectively engage either said brake means or said clutch means, and means effective after a predetermined reduction of torque reaction on the sun gear, while the clutch means is locking the sun gear and ring gear together, for releasing the brake means.

6. In a drive mechanism having a drive member, a driven member, and planetary gearing including a sun gear and a ring gear establishing the drive connection between said members, means for controlling the driving speed through the planetary gearing comprising clutch means operable to lock said sun gear and said ring gear together to provide one driving speed, brake means operable to hold said sun gear and shiftable a limited extent in response to torque reaction on the sun gear, hydraulic means connected to engage the brake and the clutch, a selector valve controlling application of the hydraulic means to the brake means and the clutch means, a governor controlled solenoid for actuating said selector valve, and means movable with said brake means in response to reduction of torque reaction on the sun gear to control the release of the hydraulic means applying the brake means after the valve is adjusted for clutch means engagement.

7. In a drive mechanism having a drive member, a driven member, and planetary gearing including a sun gear and a ring gear establishing the drive connection between said members, means for controlling the driving speed through the planetary gearing comprising clutch means operable to lock said sun gear and said ring gear together to provide one driving speed, brake means operable to hold said sun gear and shiftable a limited extent in response to torque reaction on the sun gear, hydraulic means connected to engage the brake and the clutch, a compound selector valve means controlling application of the hydraulic means to engage the clutch means and the brake means, said valve means having a movable member selecting the means to be engaged and another movable member controlling relief of the hydraulic means applying the brake means when shut off, a governor controlled solenoid for moving said selecting valve member in one direction, and means connecting the relief controlling valve member with the torque reaction shiftable brake means, said relief valve member relieving the hydraulic means acting to engage the brake band in response to torque reaction reduction on the sun gear as the clutch means engages.

8. In a drive mechanism, a drive shaft, a driven shaft, planetary gearing connected in driving relation between said shafts including a sun gear, a brake drum fixed to rotate with said sun gear, a brake band around said drum, an anchor member connected to one end of the band and having limited movement in response to torque reaction on the band when applied in a direction contracting the band, an actuator lever mounted on the anchor member and connected to the free end of the band, abutment means limiting movement of the anchor member, and a spring opposing movement of the anchor member by torque reaction on the band.

9. In a drive mechanism having a power shaft, a driven shaft, planetary gearing connected in driving relation with the shafts and including a sun gear and a ring gear, a brake drum fixed to rotate with the sun gear, a brake band around the drum, anchor means for one end of the band having a resilient mounting, an actuating lever fixed to the other end of the band and mounted on the anchor member, piston means connected to operate said lever, a chamber in which said piston means is mounted, clutch means for locking the sun and ring gear members together, means for controlling said piston means and said clutch means comprising a valve casing, a fluid pressure system connected with said casing, a connection from the casing to the piston chamber, a connection from the casing to the clutch means, a selector valve member in the valve casing operable to open either connection to the clutch or brake chamber and to close the other, and means movable with the anchor means in response to torque reaction on the brake band for relieving the piston chamber after the fluid pressure system is open to engage the clutch means.

10. In a drive mechanism having a power shaft, a driven shaft, planetary gearing connected in driving relation with the shafts and including a sun gear and a ring gear, a brake drum fixed to rotate with the sun gear, a brake band around the drum, anchor means for one end of the band having a resilient mounting, an actuating lever fixed to the other end of the band and mounted on the anchor member, piston means connected to operate said lever, a chamber in which said piston is mounted, and clutch means for locking the sun and ring gear members together, means for controlling said piston and said clutch means comprising a valve casing having a relief port, a fluid pressure system connected with the casing, a conduit leading from the casing to the piston chamber, a conduit leading from the chamber to the valve casing, a conduit leading from the casing to the clutch means, a selector valve in the casing having a solid end operable to open either of the conduits leading to the chamber or the clutch means with the conduit leading into the casing from the fluid pressure system and at the same time shutting off the other conduit, and a hollow open end with ports adapted to register with the conduits leading to the casing from the chamber and the conduit leading to the clutch means and a port registering with the casing relief port, and a synchronizer valve member in the hollow end of the selector valve connected to move with the brake band anchor means in response to torque reaction on the brake band, said synchronizer valve member having an annular peripheral recess registering with the ports in the sleeve end of the selector valve when the conduit to the chamber is closed to connect the fluid system from the conduit leading to the clutch means with the piston chamber until torque reaction on the brake band is taken off by clutch means engagement after which the synchronizer valve will move to shut off the conduit leading from the clutch means conduit and to connect the conduit from the chamber with the relief ports.

11. In a drive mechanism having a drive shaft, a driven shaft, planetary gearing connected to transmit drive between the shafts and including a sun gear and a ring gear, clutch means operable to lock said gears together, brake means for holding said sun gear including a brake band having a movable anchor at one end and band actuating mechanism, control means for the clutch means and brake means comprising a fluid pressure system connected with the clutch means and the band actuating mechanism, a valve casing in the system, a selector valve in the casing operable to selectively open the system to either the clutch means or the brake actuating mechanism, said selector valve having a hollow open end, means for draining fluid through the hollow end of the selector valve from the brake mechanism when shut off by the selector valve, a valve in the hollow end of the selector valve for controlling drain of the pressure system from the brake mechanism, said drain control valve being connected to move with the brake band anchor in response to torque reaction on the band to open the drain means after a predetermined torque reaction reduction resulting from engagement of the clutch means.

12. In a drive mechanism having a drive shaft, a driven shaft, planetary gearing connected to transmit drive between the shafts and including a sun gear and a ring gear, clutch means operable to lock said gears together, brake means for holding said sun gear including a brake band having a movable anchor at one end and band actuating mechanism, control means for the clutch means and brake means comprising a fluid pressure system connected with the clutch means and the band actuating mechanism, a valve casing in the system, a compound valve in the casing, a selector portion of the valve being operable to open the system to either the band mechanism or the clutch means to engage the same while shutting off the system to the other end and another portion of the valve controlling drain of fluid from the brake mechanism, and a connection between the drain control portion of the valve and the movable brake band anchor, torque reaction reduction on the band induced by engagement of the clutch means acting through the anchor means and the connection to move the drain control portion of the valve to relieve pressure on the brake mechanism to release the brake band.

13. In a drive mechanism, a drive member, a driven member, planetary gearing including a ring gear and a sun gear connecting said members in drive relation, said sun gear being arranged to be rotated in a direction opposite to the rotation of the drive member, means engageable to lock said gears together, means engageable to brake said sun gear and having a fulcrum movable in response to torque reaction on the sun gear when engaged, control means for selectively engaging either one of said means and disengaging the other means, said fulcrum being responsive to movement of the brake means by torque reaction on the sun gear for maintaining application of the braking means by the control means, and a pressure means opposing movement of said fulcrum by torque reaction and operable to release the brake means prior to complete engagement of the lock means.

FOREST R. McFARLAND.